(12) United States Patent
Rajagopalan et al.

(10) Patent No.: US 10,164,679 B1
(45) Date of Patent: Dec. 25, 2018

(54) ELECTRONIC DEVICES HAVING MULTIPLE SLOT ANTENNAS

(71) Applicant: Apple Inc., Cupertino, CA (US)

(72) Inventors: Harish Rajagopalan, San Jose, CA (US); Umar Azad, Santa Clara, CA (US); Pietro Romano, Foster City, CA (US); David Garrido Lopez, Campbell, CA (US); Lu Zhang, Shanghai (CN); Rodney A. Gomez Angulo, Santa Clara, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/717,367

(22) Filed: Sep. 27, 2017

(51) Int. Cl.
| *H04B 1/44* | (2006.01) |
| *H04M 1/02* | (2006.01) |
| *H04B 1/3827* | (2015.01) |
| *H04B 7/0413* | (2017.01) |

(52) U.S. Cl.
CPC ............. *H04B 1/44* (2013.01); *H04B 1/3827* (2013.01); *H04M 1/0202* (2013.01); *H04B 7/0413* (2013.01)

(58) Field of Classification Search
CPC ................................ H04B 1/44; H04B 1/3827
See application file for complete search history.

(56) References Cited

U.S. PATENT DOCUMENTS

| 8,781,420 | B2 | 7/2014 | Schlub et al. |
| 9,035,841 | B2 | 5/2015 | Wong et al. |
| 9,196,966 | B1 | 11/2015 | Obeidat |
| 9,583,838 | B2 | 2/2017 | Zhu et al. |
| 2010/0238074 | A1* | 9/2010 | Hirabayashi ........... H01Q 1/243 343/702 |
| 2016/0072303 | A1* | 3/2016 | Jeong .................... H01Q 1/243 307/104 |
| 2016/0248147 | A1 | 8/2016 | Zhang et al. |
| 2016/0322699 | A1 | 11/2016 | Mow et al. |

OTHER PUBLICATIONS

Xu Han et al., U.S. Appl. No. 15/429,597, filed Feb. 17, 2017.
Liang Han et al., U.S. Appl. No. 15/255,770, filed Sep. 2, 2016.
Matthew A. Mow et al., U.S. Appl. No. 14/701,323, filed Apr. 30, 2015.

* cited by examiner

*Primary Examiner* — Tuan H Nguyen
(74) *Attorney, Agent, or Firm* — Treyz Law Group, P.C.; Michael H. Lyons

(57) ABSTRACT

An electronic device may have conductive housing structures and first, second, third, and fourth slot antennas having respective first, second, third, and fourth slot elements in the conductive housing structures. The third slot element may be interposed between the first and second slot elements and the second slot element may be interposed between the third and fourth slot elements. Switching circuitry may be coupled between a transceiver and the slot elements. Control circuitry may control the switching circuitry to activate a selected pair of the slot antennas based on an orientation of the device or other data. The active pair of antennas may convey radio-frequency signals at the same frequencies using a multiple-input and multiple-output (MIMO) communications scheme. In this way, the device may perform wireless communications at relatively high data throughputs regardless of how the device is being held by a user.

20 Claims, 9 Drawing Sheets

ELECTRONIC DEVICES HAVING MULTIPLE SLOT ANTENNAS

BACKGROUND

This relates to electronic devices, and more particularly, to antennas for electronic devices with wireless communications circuitry.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with a satisfactory efficiency bandwidth. In addition, in some devices a single antenna is used to cover a particular frequency band. However, in these scenarios, a single antenna may exhibit insufficient data throughput, particularly when handling communications for data-intensive device applications.

It would therefore be desirable to be able to provide improved wireless communications circuitry for wireless electronic devices.

SUMMARY

An electronic device may have a housing with conductive housing structures. The conductive housing structures may include peripheral conductive structures and a conductive layer extending between the peripheral conductive structures. The conductive layer and/or the peripheral conductive structures may define edges of slot elements in one or more slot antennas.

The electronic device may include a radio-frequency transceiver having first and second ports. The first port may be coupled to a first antenna feed of a first slot antenna and a second antenna feed of a second slot antenna. The second port may be coupled to a third antenna feed of a third slot antenna and a fourth antenna feed of a fourth slot antenna. The first slot antenna may include a first slot element, the second slot antenna may include a second slot element, the third slot antenna may include a third slot element, and the fourth slot antenna may include a fourth slot element in the conductive housing structures. The third slot element may be interposed between the first and second slot elements whereas the second slot element may be interposed between the third and fourth slot elements. Switching circuitry may be coupled between the radio-frequency transceiver and each of the antenna feeds.

The electronic device may include an orientation sensor that generates orientation data indicative of an orientation of the electronic device. Control circuitry in the device may control the switching circuitry to activate a selected pair of the first, second, third, and fourth slot antennas at a given time based on the orientation data. The active pair of antennas may transmit and receive radio-frequency signals at the same frequencies under a multiple-input and multiple-output (MIMO) communications scheme. The control circuitry may control the switching circuitry to activate the second and third antennas when the device is in a portrait orientation, the first and fourth antennas when the device is in a reverse portrait orientation, the first and third antennas when the device is in a landscape orientation, and the second and fourth antennas when the device is in a reverse landscape orientation. In this way, the electronic device may perform wireless communications using a relatively high data throughput (e.g., using a MIMO scheme) regardless of how the device is being held by a user.

DETAILED DESCRIPTION

Figure 1:
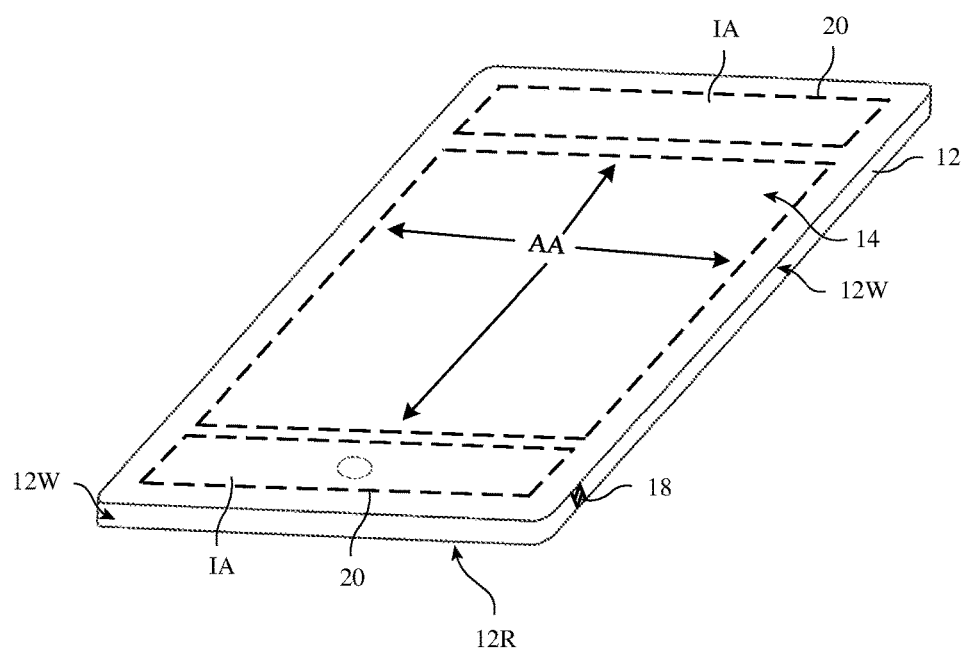
FIG. 1 is a perspective view of an illustrative electronic device in accordance with an embodiment.

An electronic device such as electronic device 10 of FIG. 1 may be provided with wireless circuitry that includes antennas. The antennas may be used to transmit and receive wireless signals.

The wireless circuitry of device 10 may handle one or more communications bands. For example, the wireless circuitry of device 10 may include a Global Position System (GPS) receiver that handles GPS satellite navigation system signals at 1575 MHz or a GLONASS receiver that handles GLONASS signals at 1609 MHz. Device 10 may also contain wireless communications circuitry that operates in communications bands such as cellular telephone bands and wireless circuitry that operates in communications bands such as the 2.4 GHz Bluetooth® band and the 2.4 GHz and 5 GHz WiFi® wireless local area network bands (sometimes referred to as IEEE 802.11 bands or wireless local area network communications bands). Device 10 may also contain wireless communications circuitry for implementing near-field communications at 13.56 MHz or other near-field communications frequencies. If desired, device 10 may include wireless communications circuitry for communicating at 60 GHz, circuitry for supporting light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R. Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Peripheral structures 12W and rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral housing structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding lip that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

If desired, rear housing wall 12R may be formed from a metal such as stainless steel or aluminum and may sometimes be referred to herein as conductive rear housing wall 12R or conductive rear wall 12R. Conductive rear housing wall 12R may lie in a plane that is parallel to display 14. In configurations for device 10 in which rear housing wall 12R is formed from metal, it may be desirable to form parts of peripheral conductive housing structures 12W as integral portions of the housing structures forming the conductive rear housing wall of housing 12. For example, conductive rear housing wall 12R of device 10 may be formed from a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Conductive rear housing wall 12R may have one or more, two or more, or three or more portions. Peripheral conductive housing structures 12W and/or the conductive rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 12W and/or 12R from view of the user).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may have an active area AA that includes an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as a speaker port or microphone port. Openings may be formed in housing 12 to form communications ports (e.g., an audio jack port, a digital data port, etc.) and/or audio ports for audio components such as a speaker and/or a microphone if desired.

Display 14 may have an inactive border region that runs along one or more of the edges of active area AA. Inactive area IA may be free of pixels for displaying images and may overlap circuitry and other internal device structures in housing 12. To block these structures from view by a user of device 10, the underside of the display cover layer or other layer in display 14 that overlaps inactive area IA may be coated with an opaque masking layer in inactive area IA. The opaque masking layer may have any suitable color.

The antennas of the wireless circuitry in device 10 can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

Portions of peripheral conductive housing structures 12W may be provided with peripheral gap structures. For example, peripheral conductive housing structures 12W may be provided with one or more peripheral gaps such as gaps 18, as shown in FIG. 1. Gaps 18 in peripheral conductive housing structures 12W may be filled with dielectric such as polymer, ceramic, glass, air, other dielectric materials, or combinations of these materials (e.g., gaps 18 may sometimes be referred to herein as dielectric gaps 18 or dielectric-filled gaps 18). Gaps 18 may divide peripheral conductive housing structures 12W into one or more peripheral conductive segments. There may be, for example, two peripheral conductive segments in peripheral housing structures 12W (e.g., in an arrangement with two of gaps 18), three peripheral conductive segments (e.g., in an arrangement with three of gaps 18), four peripheral conductive segments (e.g., in an arrangement with four of gaps 18), etc. The segments of peripheral conductive housing structures 12W that are formed in this way may form parts of antennas in device 10.

If desired, openings in housing 12 such as grooves that extend partway or completely through housing 12 may extend across the width of conductive rear housing wall 12R and may penetrate through conductive rear housing wall 12R to divide the conductive rear housing wall into different portions. These grooves may also extend into peripheral conductive housing structures 12W and may form antenna slots, gaps 18, and other structures in device 10. Polymer or other dielectric may fill these grooves and other housing openings. In some situations, housing openings that form antenna slots and other structure may be filled with a dielectric such as air.

Housing 12 may have four peripheral edges (e.g., four peripheral conductive sidewalls 12W) as shown in FIG. 1 and one or more antennas may be located along one or more of these edges. As shown in the illustrative configuration of FIG. 1, antennas may, if desired, be mounted in regions 20 along opposing peripheral edges of housing 12 (as an example). The antennas may include antenna resonating elements that emit and receive wireless signals through the front of device 10 (i.e., through inactive portions IA of display 14) and/or from the rear and sides of device 10. In practice, active components within active display area AA may block or otherwise inhibit signal reception and transmission by the antennas. By placing the antennas within regions 20 of inactive area IA of display 14, the antennas may freely pass signals through the display without the signals being blocked by active display circuitry. Antennas may also be mounted in other portions of device 10, if desired. The configuration of FIG. 1 is merely illustrative.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area of regions 20 that is available for forming antennas within device 10. In general, antennas that are provided with larger operating volumes or spaces may have higher bandwidth efficiency than antennas that are provided with smaller operating volumes or spaces. If care is not taken, increasing the size of active area AA may reduce the operating space available to the antennas, which can undesirably inhibit the efficiency bandwidth of the antennas (e.g., such that the antennas no longer exhibit satisfactory radio-frequency performance). It would therefore be desirable to be able to provide antennas that occupy a small amount of space within device 10 (e.g., to allow for as large of a display active area AA as possible) while still allowing the antennas to operate with optimal efficiency bandwidth.

Figure 2:
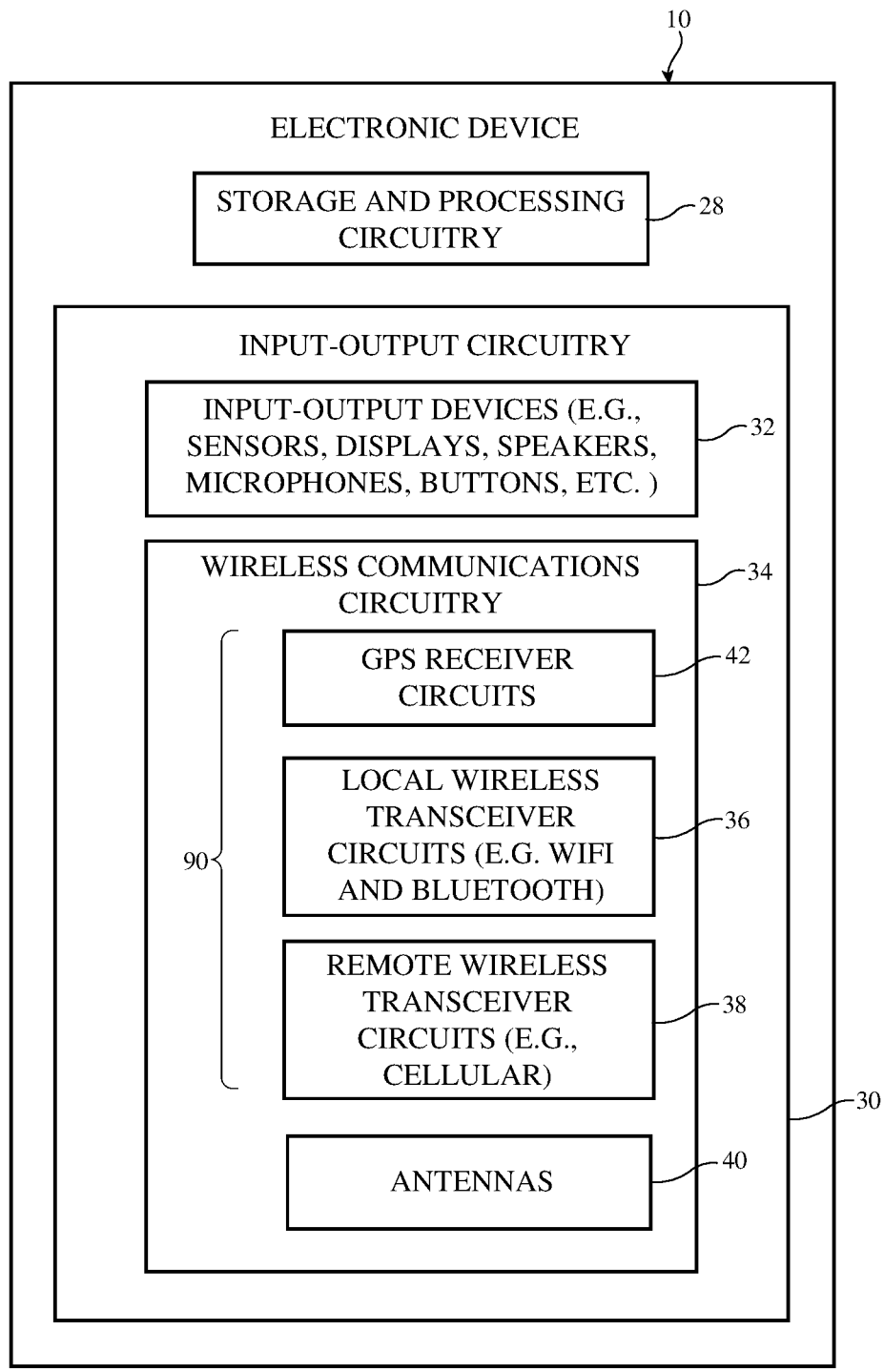
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, multiple-input and multiple-output (MIMO) protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle wireless local area network (WLAN) bands such as 2.4 GHz and 5 GHz bands for WiFi® (IEEE 802.11) communications and/or wireless personal area network (WPAN) bands such as the 2.4 GHz Bluetooth® communications band. Circuitry 34 may use cellular telephone transceiver circuitry 38 for handling wireless communications in frequency ranges such as a low communications band from 700 to 960 MHz, a low-midband from 960 to 1710 MHz, a midband from 1710 to 2170 MHz, a high band from 2300 to 2700 MHz, an ultra-high band from 3400 to 3700 MHz and/or other communications bands between 600 MHz and 4000 MHz or other suitable frequencies (as examples).

Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include satellite navigation receive equipment such as global positioning system (GPS) receiver circuitry 42 for receiving GPS signals at 1575 MHz or for handling other satellite positioning data (e.g., Global Navigation Satellite System (GLONASS) signals, etc.). In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 3:
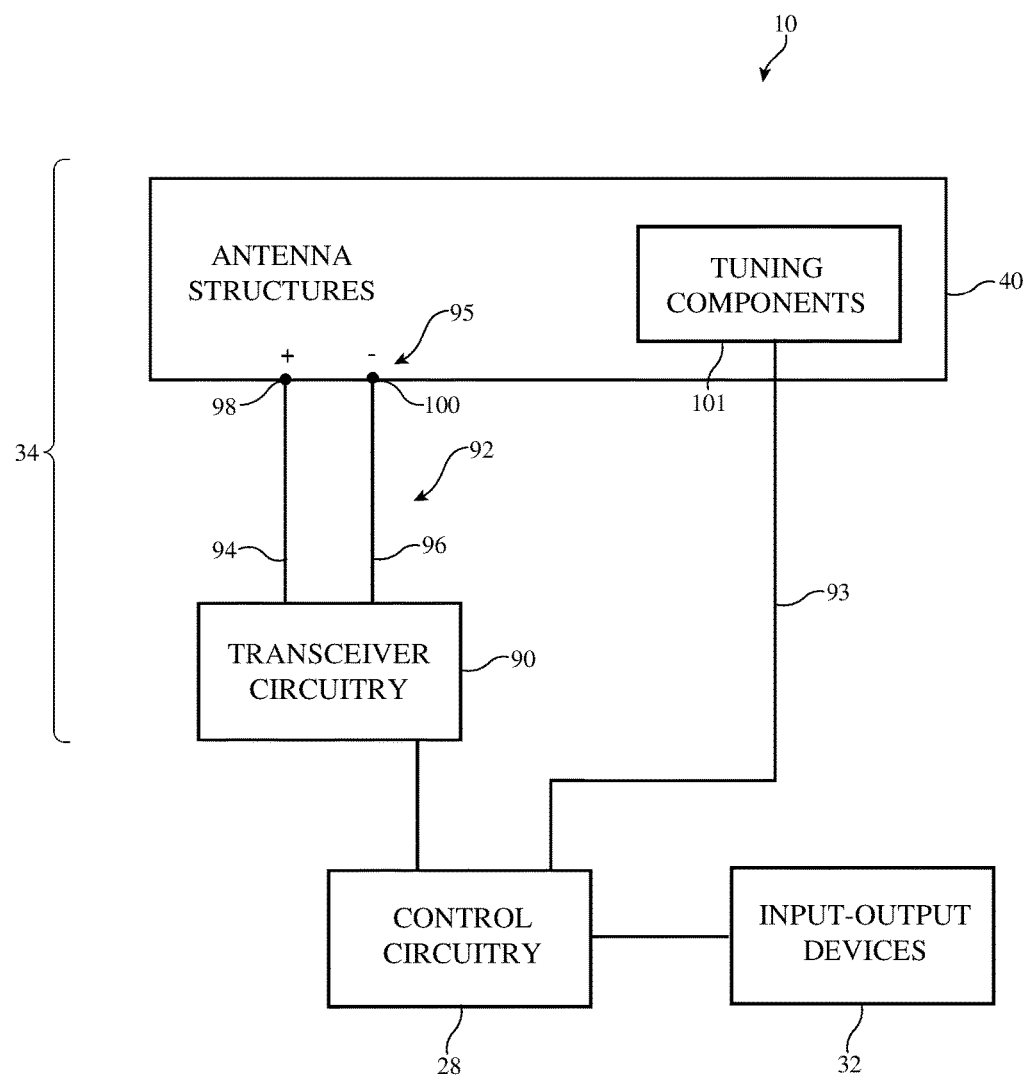
FIG. 3 is a diagram of illustrative wireless circuitry in an electronic device in accordance with an embodiment.

As shown in FIG. 3, transceiver circuitry 90 in wireless circuitry 34 may be coupled to antenna structures 40 using paths such as path 92. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with tuning circuits such as tuning components 101 to tune antennas over communications bands of interest. Tuning components 101 may be part of a filter or impedance matching network, may be part of an antenna resonating element, may span a gap between an antenna resonating element and antenna ground, etc.

Tuning components 101 may include fixed components (e.g., inductors having a fixed inductance, resistors having a fixed resistance, capacitors having a fixed capacitance, etc.) and/or may include tunable (adjustable) components such as tunable inductors, tunable capacitors, or other tunable components. Fixed tuning components 101 may include discrete components such as surface mount technology (SMT) capacitors, resistors, and/or inductors and/or may include distributed components such distributed capacitances, resistances, and/or inductances. Adjustable tuning components 101 components may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 93 that adjust inductance values, capacitance values, or other parameters associated with adjustable components in tuning components 101, thereby tuning antenna structures 40 to cover desired communications bands. Fixed components in tuning components 101 may, for example, configure antennas 40 to cover one or more desired frequency bands of interest with satisfactory antenna efficiency using the same conductive structures.

Path 92 may include one or more transmission lines. As an example, signal path 92 of FIG. 3 may be a transmission line having a positive signal conductor such as line 94 and a ground signal conductor such as line 96. Path 92 may sometimes be referred to herein as radio-frequency transmission line 92 or transmission line 92. Transmission line 92 may include a stripline transmission line, a microstrip transmission line, waveguide transmission lines, or other transmission line structures. Transmission lines in device 10 such as transmission line 92 may be integrated into rigid and/or flexible printed circuit boards. In one suitable arrangement, transmission lines in device 10 may also include transmission line conductors (e.g., signal and ground conductors) integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network (e.g., an adjustable matching network formed using tuning components 101) may include components such as inductors, resistors, and capacitors used in matching the impedance of antenna(s) 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed 95 with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 100. Other types of antenna feed arrangements may be used if desired. For example, antenna structures 40 may be fed using multiple feeds. The illustrative feeding configuration of FIG. 3 is merely illustrative.

Control circuitry 28 may use information from a proximity sensor (see, e.g., sensors 32 of FIG. 2), wireless performance metric data such as received signal strength information, device orientation information from an orientation sensor, device motion data from an accelerometer or other motion detecting sensor, information about a usage scenario of device 10, information about whether audio is being played through a speaker, information from one or more antenna impedance sensors, and/or other information in determining when antenna(s) 40 is being affected by the presence of nearby external objects or is otherwise in need of tuning. In response, control circuitry 28 may adjust an adjustable inductor, adjustable capacitor, switch, or other tunable component 101 and/or may switch one or more antennas 40 into or out of use to ensure that wireless communications circuitry 34 operates as desired.

The presence or absence of external objects such as a user's hand may affect antenna loading and therefore antenna performance. Antenna loading may differ depending on the way in which device 10 is being held. For example, antenna loading and therefore antenna performance may be affected in one way when a user is holding device 10 in a portrait orientation and may be affected in another way when a user is holding device 10 in a landscape orientation. To accommodate various loading scenarios, device 10 may use sensor data, antenna measurements, information about the usage scenario or operating state of device 10, and/or other data from input-output circuitry 32 to monitor for the presence of antenna loading (e.g., the presence of a user's hand, the user's head, or another external object). Device 10 (e.g., control circuitry 28) may then adjust tunable components 101 in antenna 40 and/or may switch other antennas into or out of use to compensate for the loading (e.g., multiple antennas 40 may be operated using a diversity protocol to ensure that at least one antenna 40 may maintain satisfactory communications even while the other antennas are blocked by external objects).

Figure 4:
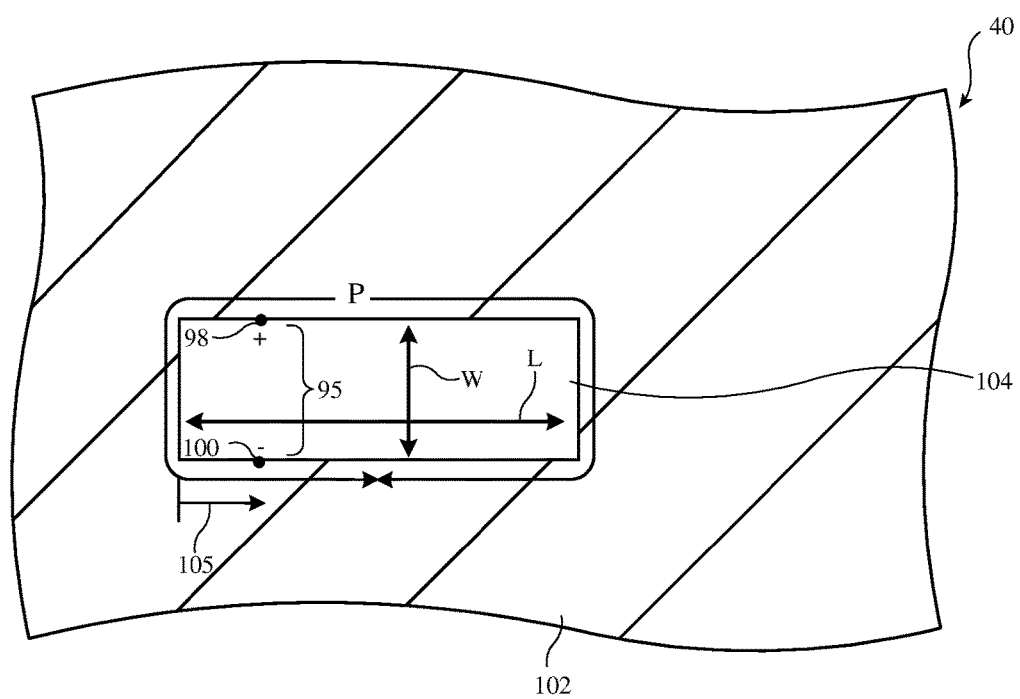
FIG. 4 is a diagram of illustrative slot antenna structures in accordance with an embodiment.

Antennas 40 may include slot antenna structures, inverted-F antenna structures (e.g., planar and non-planar inverted-F antenna structures), loop antenna structures, combinations of these, or any other antenna structures. In one suitable arrangement, antenna 40 may be formed using a slot antenna structure. An illustrative slot antenna structure that may be used for forming antenna 40 is shown in FIG. 4. As shown in FIG. 4, slot antenna 40 may include a conductive structure such as structure 102 that has been provided with a dielectric opening such as dielectric opening 104. Openings such as opening 104 of FIG. 4 are sometimes referred to as slots, slot elements, slot resonating elements, or slot antenna resonating elements of slot antenna 40. In the configuration of FIG. 4, slot element 104 is a closed slot, because portions of conductive structure 102 completely surround and enclose slot element 104. Open slot antennas may also be formed in conductive materials such as conductive structure 102 (e.g., by forming an opening in the right-hand or left-hand end of conductive structure 102 so that slot element 104 protrudes through conductive structure 102).

Antenna feed 95 for antenna 40 may be formed using positive antenna feed terminal 98 and ground antenna feed terminal 100. In general, the frequency response of an antenna is related to the size and shapes of the conductive structures in the antenna. Slot antennas of the type shown in FIG. 4 tend to exhibit response peaks when slot perimeter P is equal to the wavelength of operation of antenna 40 (e.g. where perimeter P is equal to two times length L plus two times width W). Antenna currents may flow between feed terminals 98 and 100 around perimeter P of slot element 104. As an example, where slot length L>>slot width W, the length L of antenna 40 will tend to be about half of the length of other types of antennas such as inverted-F antennas configured to handle signals at the same frequencies. Given equal antenna volumes, slot antenna 40 will therefore be able to handle signals at approximately twice the frequency of other antennas such as inverted-F antennas, for example.

Feed 95 may be coupled across slot element 104 at a location along length L. For example, feed 95 may be located at a distance 105 from one side of slot element 104. Distance 105 may be adjusted to match the impedance of antenna 40 to the impedance of the corresponding transmission line (e.g., transmission line 92 of FIG. 3). For example, the antenna current flowing around slot element 104 may experience an impedance of zero at the left and right edges of slot element 104 (e.g., a short circuit impedance) and an infinite (open circuit) impedance at the center of slot element 104 (e.g., at a fundamental frequency of the slot). Location 105 may be located between the center of slot element 104 and the left edge at a location where the antenna current experiences an impedance that matches the impedance of the corresponding transmission line, for example (e.g., distance 105 may be between 0 and ¼% of the wavelength of operation of antenna 40). Distance 105 may, for example, be 9 mm, between 5 mm and 10 mm, between 2 mm and 12 mm, or any other suitable distance. Slot element 104 may have a width W perpendicular to length L.

In scenarios where slot element 104 is a closed slot, length L may be approximately equal to (e.g., within 15% of) one half of a wavelength of operation of antenna 40 (e.g., a wavelength of a fundamental mode of antenna 40). Harmonic modes of slot element 104 may also be configured to cover desired frequency bands. In scenarios where slot element 104 is an open slot, the length of slot element 104 may be approximately equal to one quarter of the wavelength of operation of antenna 40. The wavelength of operation may, for example, be an effective wavelength of operation based on the dielectric material within slot element 104.

The example of FIG. 4 is merely illustrative. In general, slot element 104 may have any desired shape (e.g., where the perimeter P of slot element 104 defines resonant characteristics of antenna 40). For example, slot element 104 may have a meandering shape with different segments extending in different directions, may have straight and/or curved edges, etc. Conductive structure 102 may be formed from any desired conductive electronic device structures. For example, conductive structure 102 may include conductive traces on printed circuit boards or other substrates, sheet metal, metal foil, conductive structures associated with display 14 (FIG. 1), conductive portions of housing 12 (e.g., conductive walls 12W and/or 12R of FIG. 1), or other conductive structures within device 10. In one suitable arrangement, different sides (edges) of slot element 104 may be defined by different conductive structures.

In the example of FIG. 4, a single slot antenna 40 is shown. When operating using a single antenna 40, a single stream of wireless data may be conveyed between device 10 and external communications equipment (e.g., one or more other wireless devices such as wireless base stations, access points, cellular telephones, computers, etc.). This may impose an upper limit on the data rate (data throughput) obtainable by wireless communications circuitry 34 in communicating with the external communications equipment. As software applications and other device operations increase in complexity over time, the amount of data that needs to be conveyed between device 10 and the external communications equipment typically increases, such that a single antenna 40 may not be capable of providing sufficient data throughput for handling the desired device operations.

In order to increase the overall data throughput of wireless circuitry 34, multiple antennas 40 may be operated using a multiple-input and multiple-output (MIMO) scheme. When operating using a MIMO scheme, two or more antennas 40 on device 10 may be used to convey multiple independent streams of wireless data at the same frequencies. This may significantly increase the overall data throughput between device 10 and the external communications equipment relative to scenarios where only a single antenna 40 is used. In general, the greater the number of antennas 40 that are used for conveying wireless data under the MIMO scheme, the greater the overall throughput of circuitry 34.

Figure 5:
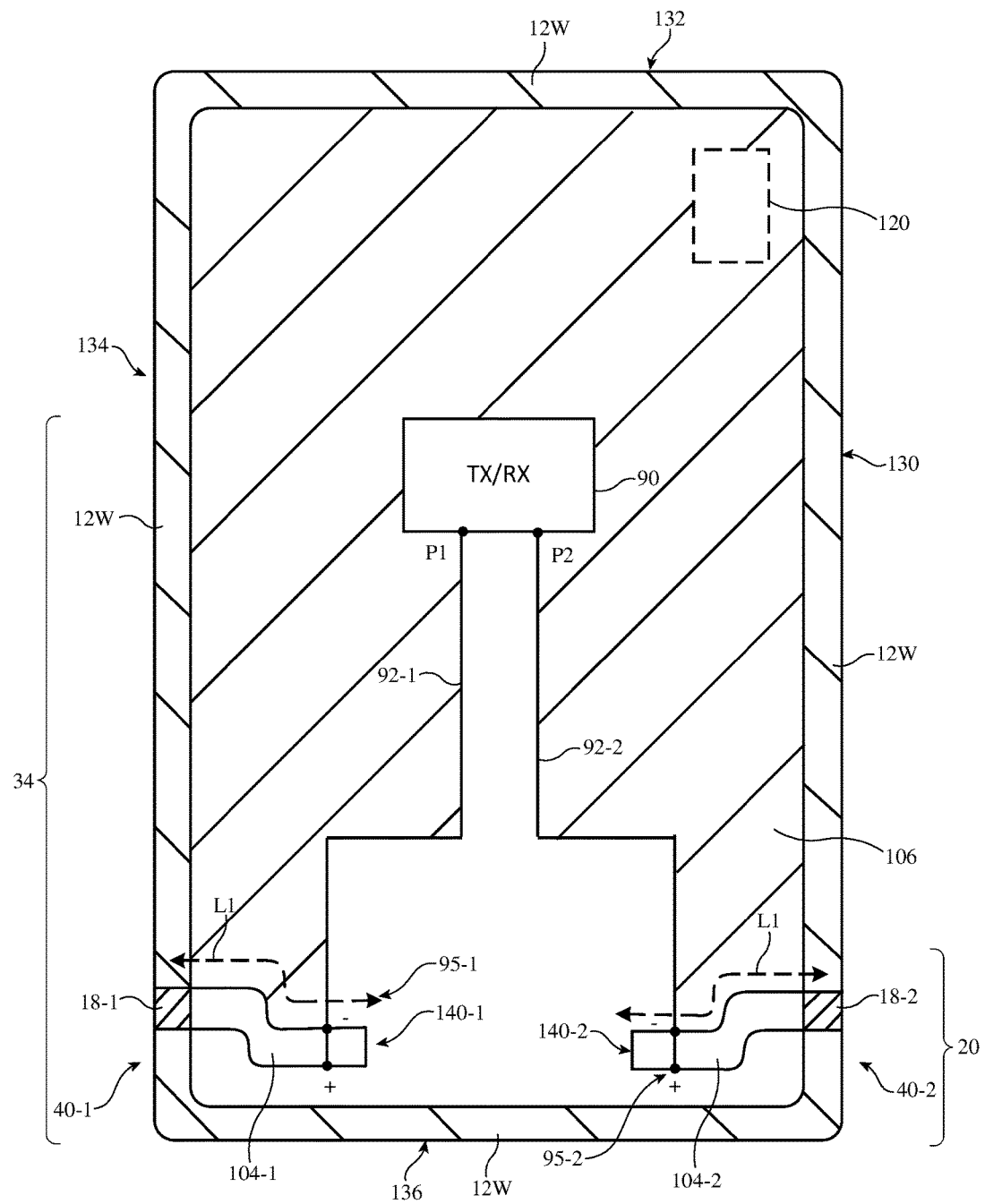
FIG. 5 is a top view of illustrative slot antennas in an electronic device in accordance with an embodiment.

A top interior view of an illustrative device 10 that contains multiple antennas 40 (e.g., for performing communications under a MIMO scheme) is shown in FIG. 5. As shown in FIG. 5, device 10 may have peripheral conductive housing structures such as peripheral conductive housing sidewalls 12W. Peripheral conductive housing sidewalls 12W may define a first (upper) edge 132, a second (left) edge 134, a third (lower) edge 136, and a fourth (right) edge 130 of device 10 (in scenarios where device 10 has a substantially rectangular periphery). In the example of FIG. 5, display 14 is not shown for the sake of clarity.

Peripheral conductive housing sidewalls 12W may be continuous or may be divided by dielectric-filled peripheral gaps (e.g., plastic gaps) 18 such as a first gap 18-1 in the peripheral conductive housing sidewall 12W along edge 134 and a second gap 18-2 in the peripheral conductive housing sidewall 12W along edge 130. Gaps 18-1 and 18-2 may, for example, be formed within region 20 at the lower end of device 10 (e.g., under inactive region IA of display 14 as shown in FIG. 1). Gaps 18-1 and 18-2 may be filled with plastic, ceramic, sapphire, glass, epoxy, or other dielectric materials. The dielectric material in gaps 18-1 and 18-2 may lie flush with peripheral conductive housing sidewalls 12W at the exterior surface of device 10 if desired.

A conductive structure such as conductive layer 106 may extend between peripheral conductive housing sidewalls 12W. Conductive layer 106 may be formed from conductive housing structures, conductive structures from electrical device components in device 10, printed circuit board traces, strips of conductor such as strips of wire and metal foil, conductive components in a display (e.g., display 14 of FIG. 1), and/or other conductive structures. In one suitable arrangement, conductive layer 106 is formed from the conductive rear wall of housing 12 (e.g., conductive rear housing wall 12R as shown in FIG. 1).

As shown in FIG. 5, conductive layer 106 (e.g., conductive rear housing wall 12R) may extend between the opposing edges 134 and 130 and between opposing edges 132 and 136 of device 10. Conductive layer 106 may be formed from a separate metal structure from peripheral conductive housing sidewalls 12W or conductive layer 106 and peripheral conductive housing sidewalls 12W may be formed from the same, continuous, integral metal structure (e.g., in a unibody configuration). An input-output device such as sensor components 120 may be formed adjacent to the corner of device 10 opposite to antenna 40-1 (e.g., at the upper-right corner of device 10 defined by the intersection of edges 132 and 130). Sensor components 120 may, for example, include one or more image sensors (e.g., cameras), one or more ambient light sensors, one or more infrared sensors (e.g., infrared proximity sensors), and/or other sensor components. Components 120 may include light emitting components such as camera flash components, infrared emitters, or other light emitters if desired. Components 120 may be positioned within housing 12 at a location (e.g., a location adjacent to the upper-right corner of device 10 defined by edges 132 and 130) such that components 120 are unlikely to be covered by a user's hands when the user is holding device 10 in a portrait orientation (e.g., with edge 132 pointing upwards or away from the user and edge 136 pointing towards the user or towards the ground). Components 120 may emit light and/or receive light through the rear surface of device 10 (e.g., through a window or opening in conductive layer 106 or conductive rear housing wall 12R). This example is merely illustrative. If desired, components 120 may be formed at other locations along edge 132 (e.g., at the upper-left corner of device 10) or at any other desired location along the conductive rear housing wall.

In the example of FIG. 5, a first slot antenna 40-1 and a second slot antenna 40-2 are formed in conductive layer 106 and peripheral conductive housing sidewalls 12W (e.g., conductive layer 106 and peripheral conductive housing sidewalls 12W may form conductive structures 102 of FIG. 4). Slot antenna 40-1 may include a corresponding slot element 104-1 in conductive layer 106. Slot element 104-1 may be filled with plastic, glass, sapphire, epoxy, ceramic, or other dielectric material. Slot element 104-1 may be continuous with peripheral gap 18-1 in peripheral conductive housing sidewalls 12W (e.g., a single piece of dielectric material may be used to fill both slot element 104-1 and gap 18-1). Slot element 104-1 may have a closed end 140-1 defined by conductive layer 106 and may extend to an opposing open end formed by peripheral gap 18-1 in peripheral conductive housing sidewalls 12W (e.g., slot antenna 40-1 may be an open slot antenna and element 104-1 may be an open slot element defined by conductive structures 106 and 12W).

Antenna 40-1 may be fed using a corresponding antenna feed 95-1 coupled across slot element 104-1. Antenna feed 95-1 may be coupled to a corresponding port P1 of transceiver circuitry 90 over a corresponding radio-frequency transmission line 92-1. The frequency response of open slot antenna 40-1 may be determined by the elongated length L1 of slot element 104-1 and gap 18-1 (e.g., length L1 may include the vertical height of gap 18-1 extending up the vertical height of peripheral conductive housing sidewalls 12W from conductive rear housing wall 12R to display 14 as shown by gap 18 in FIG. 1). Length L1 may be approximately equal to one quarter of the wavelength of operation of antenna 40-1, for example.

In the example of FIG. 5, slot element 104-1 has a meandering shape with a first segment coupled to feed 95-1, a second segment extending from an end of the first segment and perpendicular to the first segment, and a third segment extending from an end of the second segment to gap 18-1 approximately parallel to the first segment. This is merely illustrative. In general, slot element 104-1 may be straight or may have any desired shape having any desired number of segments and straight and/or curved edges.

Slot antenna 40-2 may include a corresponding slot element 104-2 in conductive layer 106. Slot element 104-2 may be filled with plastic, glass, sapphire, epoxy, ceramic, or other dielectric material. Slot element 104-2 may be continuous with peripheral gap 18-2 in peripheral conductive housing sidewalls 12W (e.g., a single piece of dielectric material may be used to fill both slot element 104-2 and gap 18-2). Slot element 104-2 may have a closed end 140-2 defined by conductive layer 106 and may extend to an opposing open end formed by peripheral gap 18-2 in peripheral conductive housing sidewall 12W (e.g., slot antenna 40-2 may be an open slot antenna and element 104-2 may be an open slot element defined by conductive structures 106 and 12W).

Antenna 40-2 may be fed using a corresponding antenna feed 95-2 coupled across slot 104-2. Antenna feed 95-2 may be coupled to a corresponding port P2 of transceiver circuitry 90 over a corresponding radio-frequency transmission line 92-2. The frequency response of open slot antenna 40-2 may be determined by the elongated length L1 of slot element 104-2 and gap 18-2 (e.g., length L1 may include the vertical height of gap 18-2 extending up the vertical height of peripheral conductive housing sidewall 12W from conductive rear housing wall 12R to display 14 as shown by gap 18 in FIG. 1). Length L1 may be approximately equal to one quarter of the wavelength of operation of antenna 40-2, for example.

In the example of FIG. 5, slot element 104-2 has a meandering shape with a first segment coupled to feed 95-2, a second segment extending from an end of the first segment and perpendicular to the first segment, and a third segment extending from an end of the second segment to gap 18-2 approximately parallel to the first segment. This is merely illustrative. In general, slot element 104-2 may be straight or may have any desired shape having any desired number of segments and straight and/or curved edges.

In order to enhance the data throughput of wireless circuitry 34, transceiver circuitry 90 may perform communications under a MIMO scheme using antennas 40-1 and 40-2. In order to perform MIMO communications, transceiver 90 may convey radio-frequency signals at the same frequencies (e.g., in the same frequency band) over antennas 40-1 and 40-2. Because antennas 40-1 and 40-2 need to cover the same frequencies, the size and shape of slot element 104-1 and gap 18-1 may be the same as the size and shape of slot element 104-2 and gap 18-2 (e.g., both antennas 40-1 and 40-2 may be characterized by elongated length L1). In one suitable arrangement, transceiver circuitry 90 may include wireless local area network transceiver circuitry 36 (FIG. 2) having ports P1 and P2 for performing MIMO operations.

The example of FIG. 5 is merely illustrative. The edges of slot elements 104-1 and 104-2 may be defined by conductive layer 106 and/or portions of one or more peripheral conductive housing sidewalls 12W. For example, the lower edges of slot element 104-1 (e.g., the edges coupled to the positive feed terminal of the corresponding antenna feed 95) may be defined by a portion of the peripheral conductive housing sidewall 12W at edge 136 of device 10 and a portion of the peripheral conductive housing sidewall 12W at edge 134 of device 10. Similarly, the lower edges of slot element 104-2 may be defined by a portion of the peripheral conductive housing sidewall 12W at edge 136 and a portion of the peripheral conductive housing sidewall 12W at edge 130. In another suitable arrangement, one or more of the edges of slot elements 104-1 and 104-2 may be defined by a curved portion of housing 12 where peripheral conductive housing sidewalls 12W join with conductive layer 106 (e.g., in scenarios where peripheral conductive housing sidewalls 12W and conductive rear housing wall 12R are formed from a single continuous piece of metal in a unibody configuration). If desired, the positions of the positive and ground feed terminals in one or both of feeds 95-1 and 95-2 may be swapped. Device 10 need not have a substantially rectangular periphery and may, if desired, have other shapes.

When configured in this way, transceiver circuitry 90 may convey wireless signals at the same frequencies using both antennas 40-1 and 40-2 (e.g., under a MIMO scheme) with a greater data throughput than in scenarios where only one of antennas 40 are used. However, if care is not taken, antennas 40-1 and 40-2 may be susceptible to loading by external objects such as a user's hands. For example, if a user is holding device 10 in a portrait orientation, the user's hands may cover one or both of antennas 40-1 and 40-2. The user's hands may load antennas 40-1 and 40-2, causing antennas 40-1 and 40-2 to become detuned and/or to exhibit deteriorated antenna efficiency. This may generate errors in the conveyed wireless data, may cause wireless circuitry 34 to lose MIMO functionality (e.g., if only one of antennas 40-1 and 40-2 is operating properly, wireless circuitry 34 will be incapable of achieving the high data throughput associated with MIMO operations), and/or may cause the corresponding wireless connection to be dropped.

In another possible arrangement, antennas 40-1 and 40-2 may be formed using closed slots located within layer 106 (e.g., at locations between ends 140-1 and 140-2 as shown in FIG. 5). However, in these scenarios, if a user is holding device 10 in a landscape orientation, the user's hands may still cover one or both of the antennas, causing the covered antenna to become detuned and/or to exhibit deteriorated antenna efficiency and thereby preventing the performance of satisfactory MIMO communications.

Figure 6:
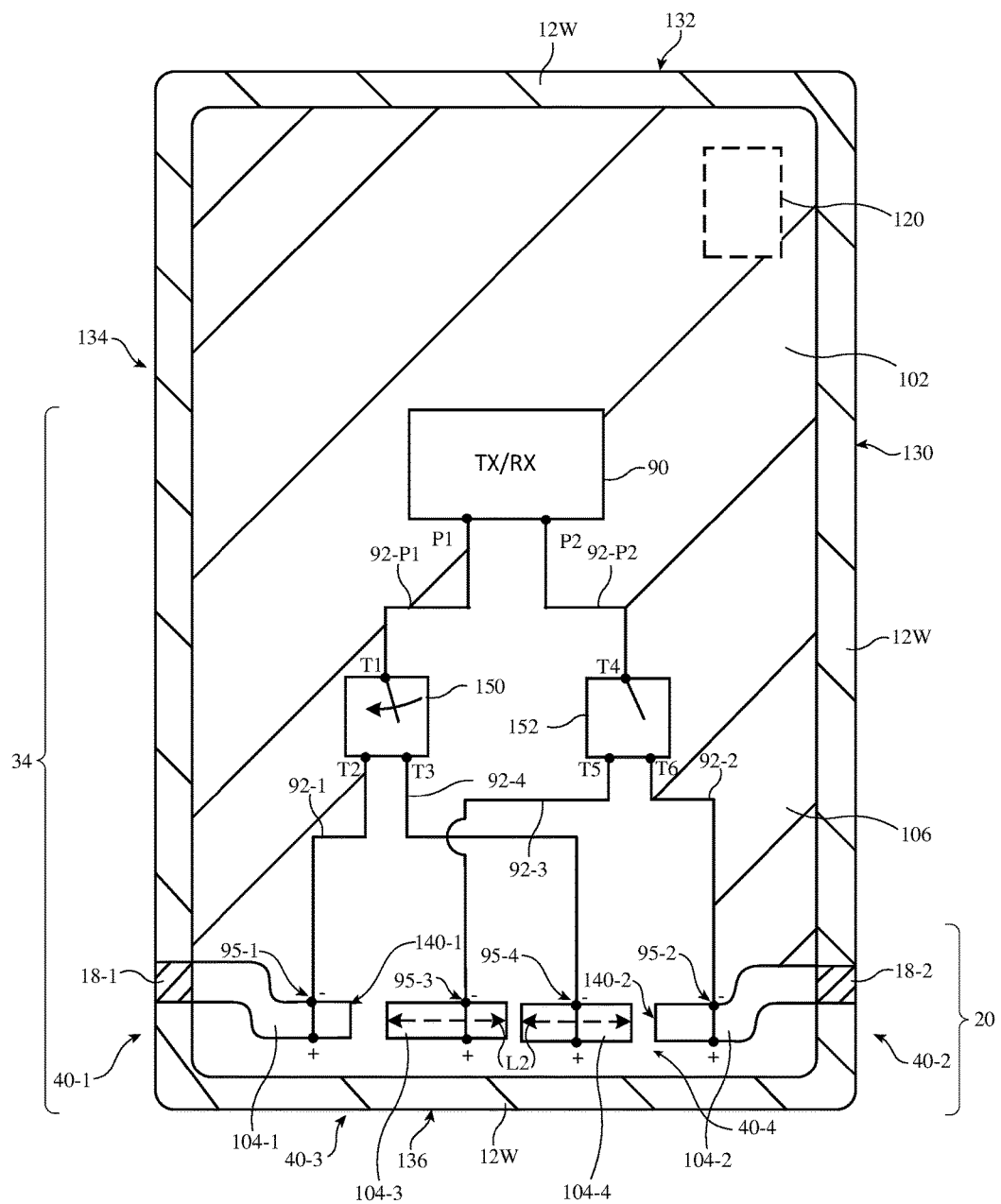
FIG. 6 is a top view of illustrative slot antennas in an electronic device that can be switched into or out of use based on the orientation of the electronic device in accordance with an embodiment.

FIG. 6 is a top interior view of device 10 showing how device 10 may be configured to maintain MIMO operations regardless of how the user is holding device 10. As shown in FIG. 6, additional slot antennas 40 such as slot antennas 40-3 and 40-4 may be formed in conductive layer 106. Slot antenna 40-3 may include a corresponding slot element 104-3 in conductive layer 106. Slot element 104-3 may be filled with plastic, glass, sapphire, epoxy, ceramic, or other dielectric material. The dielectric material in slot element 104-2 may, for example, lie flush with layer 106 and/or the exterior surface(s) of device 10. Slot element 104-3 may be a closed slot having elongated length L2 extending between opposing closed ends of slot element 104-3 (e.g., slot antenna 40-3 may be a closed slot antenna).

Antenna 40-3 may be fed using a corresponding antenna feed 95-3 coupled across slot element 104-3. Antenna feed 95-3 may be coupled to a corresponding radio-frequency transmission line 92-3. The frequency response of closed slot antenna 40-3 may be determined by the elongated length L2 of slot element 104-3. Length L2 may be approximately equal to one half of the wavelength of operation of antennas 40-1, 40-2, 40-3, and 40-4 (e.g., length L2 may be approximately twice length L1). If desired, a harmonic mode of slot element 104-3 may be used to cover the same frequencies as the fundamental mode of slots elements 104-1 and 104-2 (e.g., for performing MIMO communications at the same frequencies as antennas 40-1 and 40-2).

In the example of FIG. 6, slot element 104-3 has a straight shape. This is merely illustrative. In general, slot element 104-3 may follow a meandering path or may have any desired shape having any desired number of segments and straight and/or curved edges. Each of the edges of slot element 104-3 may be defined by conductive layer 106 and/or portions of the peripheral conductive housing sidewall 12W at edge 136 of device 10. For example, the lower edge of slot element 104-3 (e.g., the edge coupled to the positive feed terminal of antenna feed 95-3) may be defined by a portion of the peripheral conductive housing sidewall 12W at edge 136 of device 10. In another suitable arrangement, one or more of the edges of slot element 104-3 may be defined by a curved portion of housing 12 where peripheral conductive housing sidewall 12W joins with conductive layer 106 (e.g., in scenarios where peripheral conductive housing sidewalls 12W and conductive rear housing wall 12R are formed from a single continuous piece of metal in a unibody configuration). If desired, the positions of the positive and ground feed terminals of feed 95-3 may be swapped.

Slot antenna 40-4 may include a corresponding slot element 104-4 in conductive layer 106. Slot element 104-4 may be filled with plastic, glass, sapphire, epoxy, ceramic, or other dielectric material. The dielectric material in slot element 104-4 may lie flush with layer 106 and/or the exterior surface(s) of device 10. Slot element 104-4 may be a closed slot having elongated length L2 extending between opposing closed ends of slot element 104-4 (e.g., slot antenna 40-4 may be a closed slot antenna having the same length, shape, and/or dimensions as slot 104-3 in antenna 40-3).

Antenna 40-4 may be fed using a corresponding antenna feed 95-4 coupled across slot element 104-4. Antenna feed 95-4 may be coupled to a corresponding radio-frequency transmission line 92-4. A harmonic mode of slot element 104-4 may be used to cover the same frequencies as the fundamental mode of slot elements 104-1 and 104-2 and the harmonic mode of slot element 104-3 (e.g., for performing MIMO communications at the same frequencies as antennas 40-1, 40-2, and 40-3).

In the example of FIG. 6, slot element 104-4 has a straight shape. This is merely illustrative. In general, slot element 104-4 may follow a meandering path or may have any desired shape having any desired number of segments and straight and/or curved edges. Each of the edges of slot element 104-4 may be defined by conductive layer 106 and/or portions of the peripheral conductive housing sidewall 12W at edge 136 of device 10. For example, the lower edge of slot element 104-4 (e.g., the edge coupled to the positive feed terminal of antenna feed 95-4) may be defined by a portion of the peripheral conductive housing sidewall 12W at edge 136 of device 10. In another suitable arrangement, one or more of the edges of slot element 104-4 may be defined by a curved portion of housing 12 where peripheral conductive housing sidewall 12W joins with conductive layer 106 (e.g., in scenarios where peripheral conductive housing sidewalls 12W and conductive rear housing wall 12R are formed from a single continuous piece of metal in a unibody configuration). If desired, the positions of the positive and ground feed terminals of feed 95-4 may be swapped.

As shown in FIG. 6, the longitudinal axis of slot element 104-3 is aligned with the longitudinal axis of slot element 104-4. The longitudinal axis of slot elements 104-3 and 104-4 may be aligned with the longitudinal axis of the segment of slot element 104-1 extending from closed end 140-1. The longitudinal axis of slot elements 104-3 and 104-4 may be aligned with the longitudinal axis of the segment of slot element 104-2 extending from closed end 140-2. Slot element 104-3 may be interposed between slot element 104-1 and slot element 104-4. Slot element 104-4 may be interposed between slot element 104-3 and slot element 104-2. Each of slot elements 104-1, 104-2, 104-3, and 104-4 may be formed within region 20 at the lower end of device 10 (e.g., under inactive area IA of display 14 as shown in FIG. 1).

Aligning slot elements 104-1, 104-2, 104-3, and 104-4 in this way may allow for the size of inactive area IA to be minimized without blocking antennas 40-1, 40-2, 40-3, and 40-4, for example. If desired, each slot element 104 may have the same width (e.g., width W of FIG. 4) or two or more slot elements 104 may have different widths. In order to ensure that antennas 40-1, 40-2, 40-3, and 40-4 are not blocked by conductive circuitry in display 14, the width of slot elements 104 may, for example, be limited by the size of inactive area IA of display 14. As examples, the widths of slot elements 104 may be approximately 0.9 mm, between 0.5 mm and 1.5 mm, between 0.7 mm and 1.2 mm, etc. Decreasing the size of inactive area IA (and thus width W) may maximize the size of active area AA on display 14 for a user of device 10, for example.

Transceiver 90 may perform MIMO operations at the same frequencies using a selected pair of antennas 40-1, 40-2, 40-3, and 40-4 at a given time. The pair of antennas that is selected (active) at a given time may be controlled by adjusting switching circuitry such as first radio-frequency switch 150 and second radio-frequency switch 152. Switches 150 and 152 may sometimes be referred to herein as switching circuits. Control circuitry 28 (FIG. 2) may provide control signals to control the state of switches 150 and 152 to activate a selected pair of antennas at a given time.

As shown in FIG. 6, switch 150 may have a first switch port (switch terminal) T1 coupled to port P1 of transceiver circuitry 90 over radio-frequency transmission line 92-P1. Switch 150 may have a second switch port T2 coupled to feed 95-1 of antenna 40-1 over radio-frequency transmission line 92-1. Switch 150 may have a third switch port T3 coupled to feed 95-4 of antenna 40-4 over radio-frequency transmission line 92-4. Switch 150 may, for example, be a single-pole double-throw (SP2T) switch having a first state at which switch port T1 is coupled (shorted) to switch port T2 and a second state at which switch port T1 is coupled to switch port T3. This is merely illustrative and, in general, any desired switching circuitry may be used in implementing switch 150.

In the first state of switch 150, port P1 of transceiver 90 may convey radio-frequency signals over antenna 40-1 (e.g., antenna 40-1 may be active or enabled while antenna 40-4 is inactive or disabled). In the second state of switch 150, port P1 of transceiver 90 may convey radio-frequency signals over antenna 40-4 (e.g., antenna 40-4 may be active or enabled while antenna 40-1 is inactive or disabled). Control circuitry 28 may provide control signals that place switch 150 in one of these first or second switch states at a given time.

Switch 152 may have a first switch port (switch terminal) T4 coupled to port P2 of transceiver circuitry 90 over radio-frequency transmission line 92-P2. Switch 152 may have a second switch port T5 coupled to feed 95-3 of antenna 40-3 over radio-frequency transmission line 92-3. Switch 152 may have a third switch port T6 coupled to feed 95-2 of antenna 40-2 over radio-frequency transmission line 92-2. Switch 152 may, for example, be a single-pole double-throw (SP2T) switch having a first state at which switch port T4 is coupled (shorted) to switch port T5 and a second state at which switch port T4 is coupled to switch port T6. This is merely illustrative and, in general, any desired switching circuitry may be used in implementing switch 152.

In the first state of switch 152, port P2 of transceiver circuitry 90 may convey radio-frequency signals over antenna 40-3 (e.g., antenna 40-3 may be active or enabled while antenna 40-2 is inactive or disabled). In the second state of switch 152, port P2 of transceiver circuitry 90 may convey radio-frequency signals over antenna 40-2 (e.g., antenna 40-2 may be active or enabled while antenna 40-3 is inactive or disabled). Control circuitry 28 may provide control signals that place switch 152 in one of these first or second switch states at a given time.

Control circuitry 28 may control switches 150 and 152 to place wireless circuitry 34 in one of four different operating states or modes during which different pairs of antennas 40-1, 40-2, 40-3, and 40-4 are active at a given time. Control circuitry 28 may select which pair of antennas are active for MIMO communications based on any desired data. The pair of selected (active) antennas may, for example, be the pair of antennas that is least likely to be loaded by a user's hands at any given time while the user is holding device 10.

The example of FIG. 6 is merely illustrative. In general, antennas 40-1, 40-2, 40-3, and 40-4 may be formed at any desired locations within device 10. Antennas 40-1, 40-2, 40-3, and 40-4 need not be slot antennas and may, in general, be formed using any desired antenna structures (e.g., where the antenna resonating element of the antenna 40-2 is interposed between the antenna resonating elements of antennas 40-1 and 40-3, the antenna resonating element of antenna 40-3 is interposed between the antenna resonating elements of antennas 40-2 and 40-4, and the antenna resonating element is coupled to the positive feed terminal in the corresponding feed 95). Slot elements 104-1, 104-2, 104-3, and 104-4 may have any desired shapes and relative orientations. In the example of FIG. 6, slot elements 104-1, 104-2, 104-3, and 104-4 are configured to cover a single frequency band (e.g., a wireless local area network frequency band). However, if desired, slot elements 104-1, 104-2, 104-3, and/or 104-4 may have multiple branches and/or filter circuitry for covering multiple different frequency bands.

Figure 7:
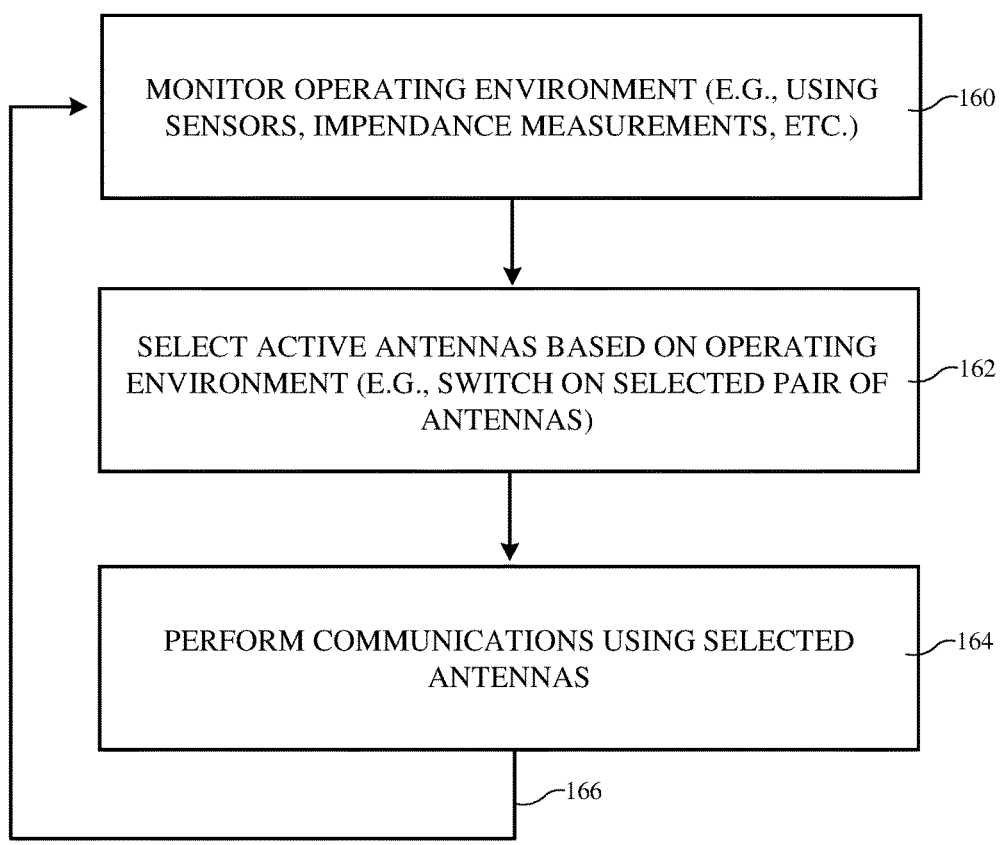
FIG. 7 is a flow chart of illustrative steps that may be involved in operating an electronic device having antennas of the type shown in FIG. 6 in accordance with an embodiment.

To ensure that wireless circuitry 34 operates satisfactorily regardless of how the user is holding device 10, control circuitry in device 10 (e.g., control circuitry 28 as shown in FIGS. 2 and 3) may determine which type of device operating environment is present and may adjust switches 150 and 152 (sometimes referred to collectively herein as switching circuitry) to selectively activate an optimal pair of antennas 40 to compensate. FIG. 7 is a flow chart of illustrative steps involved in operating device 10 to ensure satisfactory performance for wireless circuitry 34 regardless of how a user is holding device 10.

At step 160 of FIG. 7, control circuitry 28 may monitor the operating environment of device 10. Control circuitry 28 may, in general, use any suitable type of sensor measurements, wireless signal measurements, operation information, or antenna measurements to determine how device 10 is being used (e.g., to determine the operating environment of device 10). For example, control circuitry 28 may use sensors such as temperature sensors, capacitive proximity sensors, light-based proximity sensors, resistance sensors, force sensors, touch sensors, connector sensors that sense the presence of a connector in a connector port or that detect the presence or absence of data transmission through a connector port, sensors that detect whether wired or wireless headphones are being used with device 10, sensors that identify a type of headphone or accessory device that is being used with device 10 (e.g., sensors that identify an accessory identifier identifying an accessory that is being used with device 10), or other sensors to determine how device 10 is being used.

Control circuitry 28 may also use information from an orientation sensor such as an inertial sensor (e.g., accelerometer), gyroscope, and/or compass in device 10 to help determine whether device 10 is being held in a portrait orientation (e.g., an orientation at which edge 132 of device 10 as shown in FIG. 6 points upwards or away from the user), a reverse portrait orientation (e.g., an orientation at which edge 132 points towards the ground or towards the user), a landscape orientation (e.g., an orientation at which edge 130 points towards the ground or towards the user), or a reverse landscape orientation (e.g., an orientation at which edge 130 points upwards or away from the user). A user may be statistically likely to be holding device 10 in a particular manner (e.g., with the user's hands nearby to corresponding antennas 40) based on the present orientation of device 10. This information may be used to predict which antennas are likely to be loaded and thus detuned by the presence of the user's hands, for example.

If desired, control circuitry 28 may also use information about a usage scenario of device 10 in determining how device 10 is being used (e.g., information identifying whether audio data is being transmitted particular speakers of device 10, information identifying whether a telephone call is being conducted, information identifying whether a microphone on device 10 is receiving voice signals, etc.).

If desired, impedance sensors or other sensors may be used in monitoring the impedance of antennas 40-1, 40-2, 40-3, and 40-4. Different antenna loading scenarios may load antenna 40 differently, so impedance measurements may help determine whether device 10 is being gripped in a manner that causes one or more of antennas 40-1, 40-2, 40-3, or 40-4 to be loaded and detuned by the user's hand. Another way in which control circuitry 28 may monitor antenna loading conditions involves making received signal strength measurements or other wireless performance metric measurements (e.g., error rate measurements, signal to noise ratio measurements, noise measurements, etc.) on radio-frequency signals being received with each of antennas 40-1, 40-2, 40-3, and 40-4.

In general, any desired combinations of one or more of these measurements or other measurements may be processed by control circuitry 28 to identify how device 10 is being used (i.e., to identify the operating environment of device 10). Such information may be indicative of the present operating conditions of device 10 (e.g., gathered data indicative of which antennas are currently being loaded and detuned by a user's hands) and/or may be predictive of which antennas are likely to be loaded and detuned by a user's hands.

At step 162, control circuitry 28 may select an optimal pair of antennas 40-1, 40-2, 40-3, and 40-4 to be active (e.g., for performing MIMO communications) based on the current operating environment of device 10 (e.g., based on data or information gathered while processing step 160). For example, control circuitry 28 may process the data gathered while processing step 160 to determine whether device 10 is being held in a portrait orientation, a reverse portrait orientation, a landscape orientation, or a reverse landscape orientation, or whether device 10 is being held in a particular manner in which one or more of antennas 40-1, 40-2, 40-3, and 40-4 are being loaded and thus detuned by external objects such as the user's hands.

For example, if control circuitry 28 determines that device 10 is being held in a portrait orientation or that a first set of antennas 40-1, 40-2, 40-3, and 40-4 is being loaded or detuned, control circuitry 28 may select (activate) a first pair of the antennas for performing MIMO communications. If control circuitry 28 determines that device 10 is being held in a reverse portrait orientation or that a second set of antennas 40-1, 40-2, 40-3, and 40-4 is being loaded or detuned, control circuitry 28 may select (activate) a second pair of the antennas for performing MIMO communications. If control circuitry 28 determines that device 10 is being held in a landscape orientation or that a third set of antennas 40-1, 40-2, 40-3, and 40-4 is being loaded or detuned, control circuitry 28 may select (activate) a third pair of the antennas for performing MIMO communications. If control circuitry 28 determines that device 10 is being held in a reverse landscape orientation or that a fourth set of antennas 40-1, 40-2, 40-3, and 40-4 is being loaded or detuned, control circuitry 28 may select (activate) a fourth pair of the antennas for performing MIMO communications. Control circuitry 28 may adjust switches 150 and 152 to couple the selected antennas to the corresponding port of transceiver circuitry 90 (FIG. 6). If desired, control circuitry 28 may further adjust tuning components (e.g., tuning components 101 of FIG. 3) to tweak the frequency response of the selected antennas based on the data gathered while processing step 160.

At step 164, the selected pair of antennas may be used to transmit and receive wireless data using a MIMO communications scheme. This process may be performed continuously, as indicated by line 166.

Figure 8:
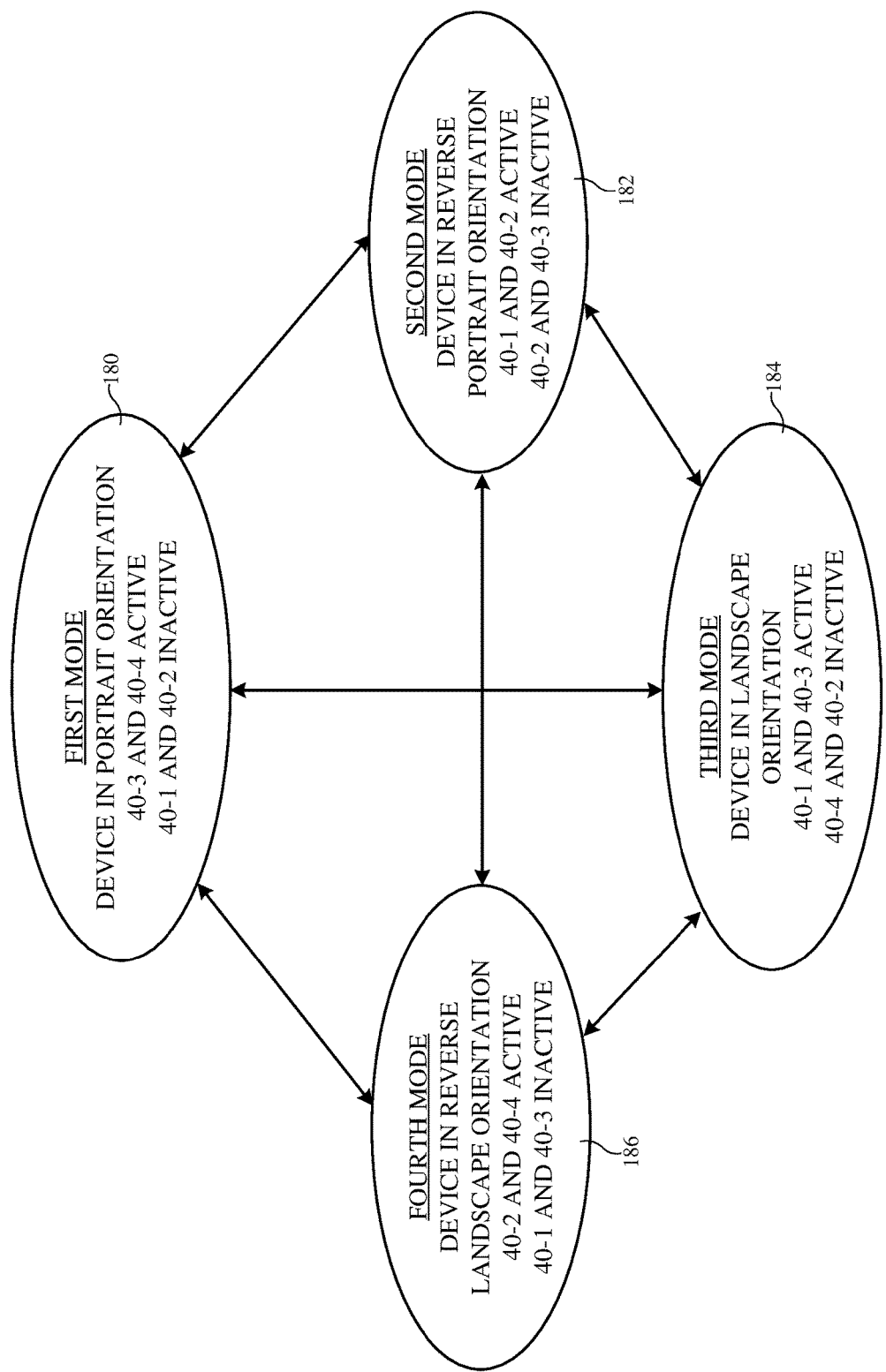
FIG. 8 is a state diagram showing illustrative wireless operating modes for an electronic device with antennas of the type shown in FIG. 6 in accordance with an embodiment.

A state diagram showing illustrative operating modes for wireless communications circuitry 34 is shown in FIG. 8. As shown in FIG. 8, wireless communications circuitry 34 may be operable in at least first, second, third, and fourth operating modes (states).

In the first mode 180 (sometimes referred to herein as portrait mode 180 or portrait state 180), antennas 40-3 and 40-4 may be active and antennas 40-1 and 40-2 may be inactive. Control circuitry 28 may control switch 152 (FIG. 6) to couple switch port T4 to switch port T5 and may control switch 150 to couple switch port T1 to switch port T3 to activate (select) antennas 40-3 and 40-4 (e.g., while processing step 162 of FIG. 7). Antennas 40-1 and 40-2 may be decoupled from transceiver circuitry 90 in mode 180. Antennas 40-3 and 40-4 may subsequently transmit and receive wireless signals in the same frequency band using a MIMO scheme (e.g., while processing step 164 of FIG. 7). Control circuitry 28 may place wireless communications circuitry 34 in first mode 180 in response to determining that one or both of antennas 40-1 and 40-2 is being loaded or detuned by external objects and/or in response to determining that device 10 is being held in the portrait orientation, for example.

In the second mode 182 (sometimes referred to herein as reverse portrait mode 182 or reverse portrait state 182), antennas 40-1 and 40-2 may be active and antennas 40-3 and 40-4 may be inactive. Control circuitry 28 may control switch 152 to couple switch port T4 to switch port T6 and may control switch 150 to couple switch port T1 to switch port T2 to activate (select) antennas 40-1 and 40-2 (e.g., while processing step 162 of FIG. 7). Antennas 40-3 and 40-4 may be decoupled from transceiver circuitry 90 in mode 182. Antennas 40-1 and 40-2 may subsequently transmit and receive wireless signals in the same frequency band using a MIMO scheme (e.g., while processing step 164 of FIG. 7). Control circuitry 28 may place wireless communications circuitry 34 in second mode 182 in response to determining that one or both of antennas 40-3 and 40-4 is being loaded or detuned by external objects, in response to determining that none of antennas 40-1, 40-2, 40-3, and 40-4 is being loaded or detuned by external objects (e.g., state 182 may be a default or free space state for circuitry 34), and/or in response to determining that device 10 is being held in the reverse portrait orientation, for example.

In the third mode 184 (sometimes referred to herein as landscape mode 184 or landscape state 184), antennas 40-1 and 40-3 may be active and antennas 40-2 and 40-4 may be inactive. Control circuitry 28 may control switch 152 to couple switch port T4 to switch port T5 and may control switch 150 to couple switch port T1 to switch port T2 to activate (select) antennas 40-1 and 40-3 (e.g., while processing step 162 of FIG. 7). Antennas 40-2 and 40-4 may be decoupled from transceiver circuitry 90 in mode 184. Antennas 40-1 and 40-3 may subsequently transmit and receive wireless signals in the same frequency band using a MIMO scheme (e.g., while processing step 164 of FIG. 7). Control circuitry 28 may place wireless communications circuitry 34 in third mode 184 in response to determining that one or both of antennas 40-4 and 40-2 is being loaded or detuned by external objects and/or in response to determining that device 10 is being held in the landscape orientation, for example.

In the fourth mode 186 (sometimes referred to herein as reverse landscape mode 186 or reverse landscape state 186), antennas 40-2 and 40-4 may be active and antennas 40-1 and 40-3 may be inactive. Control circuitry 28 may control switch 152 to couple switch port T4 to switch port T6 and may control switch 150 to couple switch port T1 to switch port T3 to activate (select) antennas 40-2 and 40-4 (e.g., while processing step 162 of FIG. 7). Antennas 40-1 and 40-3 may be decoupled from transceiver circuitry 90 in mode 186. Antennas 40-2 and 40-4 may subsequently transmit and receive wireless signals in the same frequency band using a MIMO scheme (e.g., while processing step 164 of FIG. 7). Control circuitry 28 may place wireless communications circuitry 34 in fourth mode 186 in response to determining that one or both of antennas 40-1 and 40-3 is being loaded or detuned by external objects and/or in response to determining that device 10 is being held in the reverse landscape orientation, for example. Control circuitry 28 may identify which mode is to be used based on the monitored operating environment of device 10 (e.g., using the sensor data and other information gathered while processing step 160 of FIG. 7) and may adjust switches 150 and 152 of FIG. 6 to place wireless circuitry 34 in the corresponding operating mode.

Figure 9A:
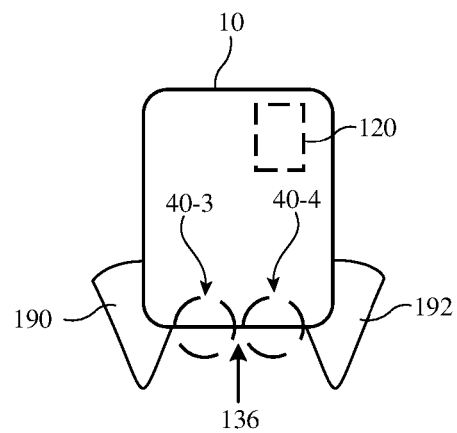
FIGS. 9A-9D are diagrams showing how different illustrative antennas may be activate in different device orientations in accordance with an embodiment.

FIGS. 9A-9D are diagrams showing how device 10 may be operated in each of modes 180, 182, 184, and 186 of FIG. 8. As shown in FIG. 9A, when device 10 is held in a portrait orientation, the user's body (e.g., left hand 190 and/or right hand 192) may be statistically likely to hold the bottom-left and bottom-right corners of device 10. When held in this orientation (e.g., with lower edge 136 of device 10 pointing downwards or towards the user and sensor 120 pointed away from the user's body or towards the ground), left hand 190 may load and detune antenna 40-1 and right hand 192 may load and detune antenna 40-2 (FIG. 6). However, antennas 40-3 and 40-4 may be sufficiently far from hands 190 and 192 so as to not be significantly loaded or detuned by hands 190 and 192. Control circuitry 28 may subsequently place device 10 in portrait mode 180 of FIG. 8. In this mode, antennas 40-3 and 40-4 may both convey radio-frequency signals in the same frequency band under a MIMO scheme (e.g., without being impacted by hands 190 or 192).

Figure 9B:
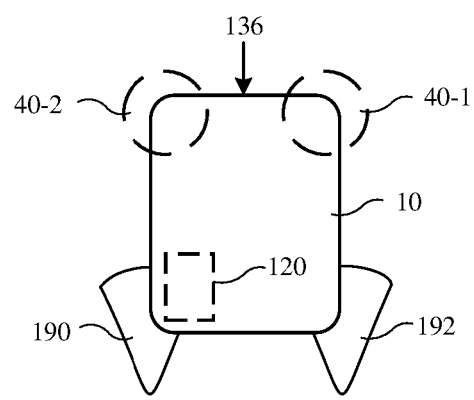

As shown in FIG. 9B, when device 10 is held in a reverse portrait orientation, left hand 190 and/or right hand 192 may be statistically likely to hold the top-right and top-left corners of device 10. When held in this orientation (e.g., with lower edge 136 of device 10 pointing upwards or away from the user and sensor 120 located next to hand 190 and pointed away from the user or towards the ground), antennas 40-1, 40-2, 40-3, and 40-4 may be sufficiently far from hands 190 and 192 so as to not be significantly loaded or detuned by hands 190 and 192. Control circuitry 28 may subsequently place device 10 in reverse portrait mode 182 of FIG. 8. In this mode, antennas 40-1 and 40-2 may both convey radio-frequency signals in the same frequency band under a MIMO scheme (e.g., without being impacted by hands 190 or 192). Antennas 40-1 and 40-2 are located farther apart than antennas 40-3 and 40-4 and may offer a greater degree of spatial diversity than antennas 40-3 and 40-4, for example.

Figure 9C:
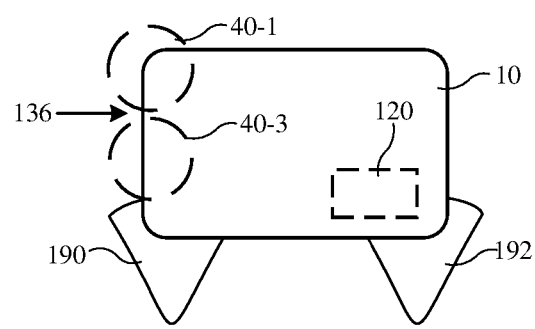

As shown in FIG. 9C, when device 10 is held in a landscape orientation, left hand 190 and/or right hand 192 may be statistically likely to hold the bottom-right and top-right corners of device 10, respectively. When held in this orientation (e.g., with edge 136 of device 10 pointing towards the left and conductive rear housing wall 12R pointing towards the ground or away from the user's body), left hand 190 may load and detune antenna 40-2 and/or antenna 40-4. However, antennas 40-1 and 40-3 may be sufficiently far from hands 190 and 192 so as to not be significantly loaded or detuned by hands 190 and 192. Control circuitry 28 may subsequently place device 10 in landscape mode 184 of FIG. 8. In this mode, antennas 40-1 and 40-3 may both convey radio-frequency signals in the same frequency band under a MIMO scheme (e.g., without being impacted by hands 190 or 192).

Figure 9D:
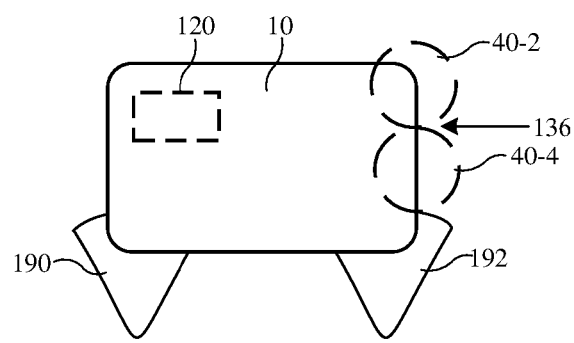

As shown in FIG. 9D, when device 10 is held in a reverse landscape orientation, left hand 190 and/or right hand 192 may be statistically likely to hold the top-left and bottom-left corners of device 10, respectively. When held in this orientation (e.g., with edge 136 of device 10 pointing towards the right and conductive rear housing wall 12R pointing towards the ground or away from the user's body), right hand 192 may load and detune antenna 40-1 and/or antenna 40-3. However, antennas 40-2 and 40-4 may be sufficiently far from hands 190 and 192 so as to not be significantly loaded or detuned by hands 190 and 192. Control circuitry 28 may subsequently place device 10 in reverse landscape mode 186 of FIG. 8. In this mode, antennas 40-4 and 40-2 may both convey radio-frequency signals in the same frequency band under a MIMO scheme (e.g., without being impacted by hands 190 or 192).

The examples of FIGS. 9A-9D are merely illustrative. In general, any desired information such as wireless performance metric information, sensor information, device usage information, and impedance information may be used to determine which antennas are being loaded and detuned for selecting the pair of active antennas (e.g., for selecting which of the modes of FIG. 8 to use). Fewer or more than four modes may be used if desired. Two, three, or more than four antennas 40 may be used. One, two, or more than two antennas may be active in each mode. By selectively activating different sets (e.g., pairs) of antennas 40-1, 40-2, 40-3, and 40-4 based on the orientation of device 10, wireless circuitry 34 may obtain relatively high data throughput using multiple antennas regardless of how device 10 is being held by a user.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
   a housing having conductive structures;
   radio-frequency transceiver circuitry in the housing and having first and second ports;
   a first slot antenna having a first slot element in the conductive structures and a first antenna feed coupled to the first port;
   a second slot antenna having a second slot element in the conductive structures and a second antenna feed coupled to the first port; and
   a third slot antenna having a third slot element in the conductive structures and a third antenna feed coupled to the second port, wherein at least some of the third slot element is interposed between the first and second slot elements.

2. The electronic device defined in claim 1, further comprising:

a fourth slot antenna having a fourth slot element in the conductive structures and a fourth antenna feed coupled to the second port, wherein at least some of the second slot element is interposed between the third and fourth slot elements.

3. The electronic device defined in claim 2, further comprising:
a first switch that is coupled between the first port and the first and second antenna feeds and that is configured to activate a selected one of the first and second slot antennas at a given time; and
a second switch that is coupled between the second port and the third and fourth antenna feeds and that is configured to activate a selected one of the third and fourth slot antennas at a given time.

4. The electronic device defined in claim 3, wherein the radio-frequency transceiver circuitry is configured to convey radio-frequency signals at a given frequency, the electronic device further comprising:
control circuitry configured to control the first and second switches to convey the radio-frequency signals at the given frequency over a selected pair of the first, second, third, and fourth slot antennas under a multiple-input and multiple-output (MIMO) scheme.

5. The electronic device defined in claim 3, further comprising:
an orientation sensor configured to generate orientation data indicative of an orientation of the electronic device; and
control circuitry configured to control the first and second switches to activate a selected pair of the first, second, third, and fourth slot antennas based on the orientation data.

6. The electronic device defined in claim 5, wherein the control circuitry is configured to adjust the first and second switches between a first state in which the third and second slot antennas are active and the first and fourth slot antennas are inactive, a second state in which the first and fourth slot antennas are active and the second and third slot antennas are inactive, a third state in which the first and third slot antennas are active and the second and fourth slot antennas are inactive, and a fourth state in which the second and fourth slot antennas are active and the first and third slot antennas are inactive.

7. The electronic device defined in claim 6, wherein the control circuitry is configured to place the first and second switches in:
the first state in response to detecting that the electronic device is in a first orientation using the orientation data,
the second state in response to detecting that the electronic device is in a second orientation using the orientation data,
the third state in response to detecting that the electronic device is in a third orientation using the orientation data, and
the fourth state in response to detecting that the electronic device is in a fourth orientation using the orientation data.

8. The electronic device defined in claim 2, wherein the second and third slot elements comprise closed slots that are surrounded by the conductive structures and the first and fourth slot elements comprise open slots.

9. The electronic device defined in claim 8, wherein the conductive structures comprise peripheral sidewall structures and a planar rear wall structure that extends between the peripheral sidewall structures, the first slot element comprises a first dielectric-filled gap in a first portion of the peripheral sidewall structures, and the fourth slot element comprises a second dielectric-filled gap in a second portion of the peripheral sidewall structures.

10. The electronic device defined in claim 9, wherein the first and fourth slot elements each have a first elongated length and the second and third slot elements each have a second elongated length that is greater than the first elongated length.

11. The electronic device defined in claim 9, wherein the peripheral sidewall structures and the planar rear wall structure define at least some edges of each of the first, second, third, and fourth slot elements.

12. An electronic device comprising:
conductive structures;
a first slot antenna having a first slot element in the conductive structures;
a second slot antenna having a second slot element in the conductive structures;
a third slot antenna having a third slot element in the conductive structures;
radio-frequency transceiver circuitry;
switching circuitry coupled between the radio-frequency transceiver circuitry and the first, second, and third slot elements; and
control circuitry configured to adjust the switching circuitry between a first mode in which the second antenna is active and the first and third antennas are inactive, a second mode in which the first and third antennas are active and the second antenna is inactive, a third mode in which the first antenna is active and the second and third antennas are inactive, and a fourth mode in which the second and third antennas are active and the first antenna is inactive.

13. The electronic device defined in claim 12, further comprising:
a fourth slot antenna having a fourth slot element in the conductive structures, wherein the switching circuitry is coupled between the fourth slot element and the radio-frequency transceiver circuitry, the fourth antenna is active in the first and third modes, and the fourth antenna is inactive in the second and fourth modes.

14. The electronic device defined in claim 13, wherein the second slot element is interposed between the fourth and third slot elements and the fourth slot element is interposed between the first and second slot elements.

15. The electronic device defined in claim 14, wherein the first slot element includes a first segment that extends along a longitudinal axis, the third slot element includes a second segment that extends along the longitudinal axis, and the second and fourth slot elements each extend along the longitudinal axis.

16. The electronic device defined in claim 13, further comprising:
a display that forms a front face for the electronic device, wherein the conductive structures comprise rear wall that forms a rear face for the electronic device and a plurality of peripheral conductive structures that extend between the rear wall and the display, and at least one edge of each of the first, second, third, and fourth slot elements is defined by a given one of the peripheral conductive structures in the plurality of peripheral conductive structures.

17. The electronic device defined in claim 12, further comprising:
an orientation sensor that generates orientation data indicative of whether the electronic device is in first, second, third, or fourth orientations, wherein the control circuitry is configured to place the switching circuitry in:
the first mode when the orientation data indicates that the electronic device is in the first orientation,
the second mode when the orientation data indicates that the electronic device is in the second orientation,
the third mode when the orientation data indicates that the electronic device is in the third orientation, and
the fourth mode when the orientation data indicates that the electronic device is in the fourth orientation.

18. The electronic device defined in claim 12, wherein the first, second, third, and fourth antennas are each configured to convey radio-frequency signals in the same frequency band.

19. An electronic device comprising:
first, second, third, and fourth antennas having respective first, second, third, and fourth antenna resonating elements, wherein at least some of the second antenna resonating element is interposed between the first and third antenna resonating elements and at least some of the third antenna resonating element is interposed between the second and fourth antenna resonating elements; and
control circuitry configured to:
identify an orientation of the electronic device,
activate the first and second antennas and deactivate the third and fourth antennas in response to identifying that the electronic device is in a first landscape orientation, and
activate the third and fourth antennas and deactivate the first and second antennas in response to identifying that the electronic device is in a second landscape orientation that is different from the first landscape orientation.

20. The electronic device defined in claim 19, wherein the control circuitry is further configured to:
activate the second and third antennas and deactivate the first and fourth antennas in response to identifying that the electronic device is in a first portrait orientation; and
activate the first and fourth antennas and deactivate the second and third antennas in response to identifying that the electronic device is in a second portrait orientation that is different from the first portrait orientation.

* * * * *